March 29, 1960     E. W. BOLLMEIER     2,930,835
REMOVABLE SPLICE PROTECTOR
Filed Sept. 29, 1955     2 Sheets-Sheet 1
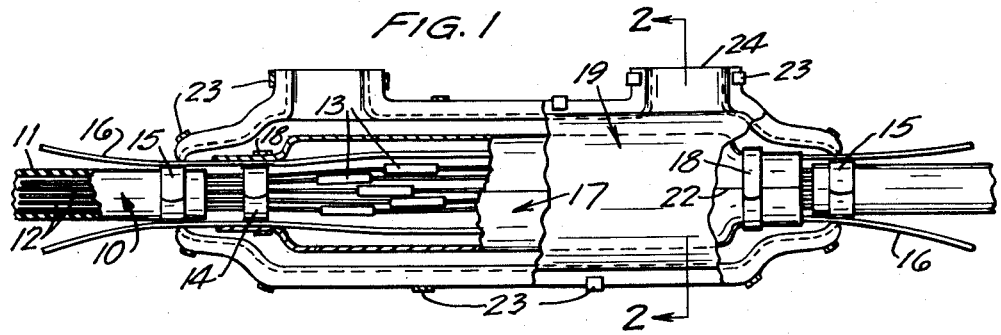
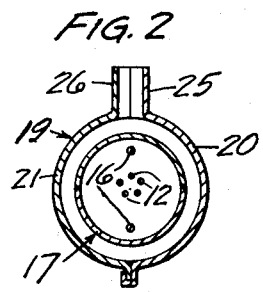  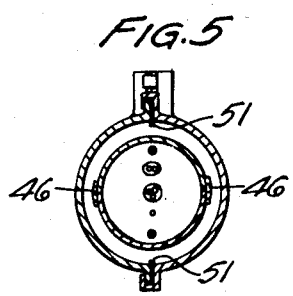 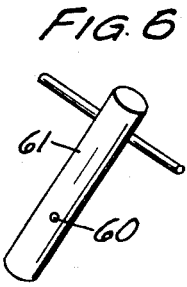
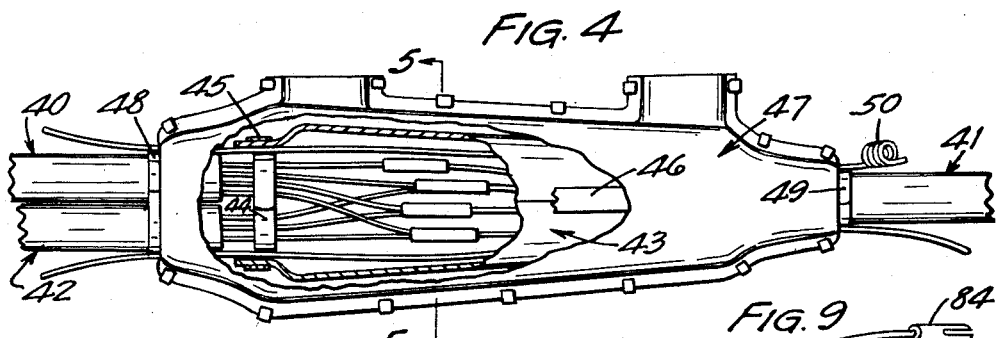
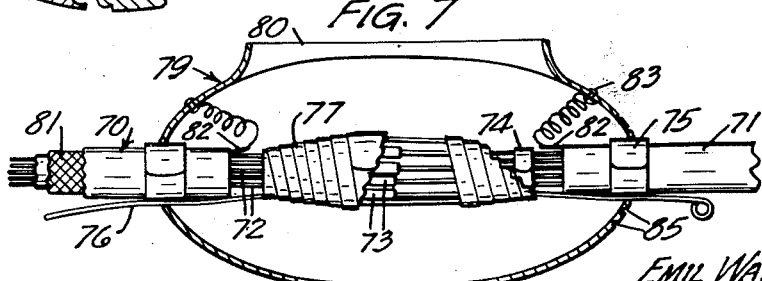
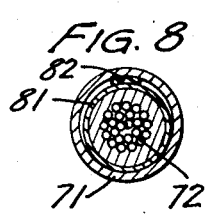
INVENTOR
EMIL WAYNE BOLLMEIER
BY
Carpenter, Abbott, Coulter & Kinney
ATTORNEYS March 29, 1960   E. W. BOLLMEIER   2,930,835
REMOVABLE SPLICE PROTECTOR
Filed Sept. 29, 1955   2 Sheets-Sheet 2

INVENTOR
EMIL WAYNE BOLLMEIER
BY
Carpenter, Abbott, Coulter & Kinney
ATTORNEYS

United States Patent Office 2,930,835
Patented Mar. 29, 1960

2,930,835

REMOVABLE SPLICE PROTECTOR

Emil Wayne Bollmeier, Mendota Township, Dakota County, Minn., assignor to Minnesota Mining & Manufacturing Company, St. Paul, Minn., a corporation of Delaware Application September 29, 1955, Serial No. 537,449

10 Claims. (Cl. 174—76)

This invention relates to a method and means for protectively covering splice areas in insulated electrical cables, and has particular reference to the sealing of splice areas in multiple conductor cables such as communications cables. The invention provides means for obtaining hermetically sealed coverings for splice areas in such cables while at the same time permitting re-entry of the splice area and without damage to the several electrical conductors or the connections therebetween. The entire splice area is sealed off from the remainder of the cable as well as from the atmosphere and is therefore effectively protected from entry of water or moisture vapor and from accompanying loss of signal transmission effectiveness.

In the drawing:

Figure 1 is a side elevation, mainly in cross-section, of one embodiment of my novel splice protector as applied to a straight splice;

Figure 2 is a section taken at line 2—2 of Figure 1;

Figure 3 illustrates in perspective an alternative detail of Figure 1;

Figure 4 is a side elevation, mainly in cross-section, of a modified form of a splice protector as applied to a Y splice;

Figure 5 is a cross-section of the assembly of Figure 4 taken at line 5—5;

Figure 6 is a view in perspective of a key employed in the opening of the splice protector of Figures 1 and 4;

Figure 7 is a side elevation, mainly in cross-section, of still another form of splice protector;

Figure 8 is a cross-sectional view of a shielded cable showing a method of grounding the same;

Figure 9 is a view in perspective of one form of probe employed in grounding shielded cables;

Figure 10 shows in cross-section a detail of the edge seal of the casing of Figure 7.

Figure 11:
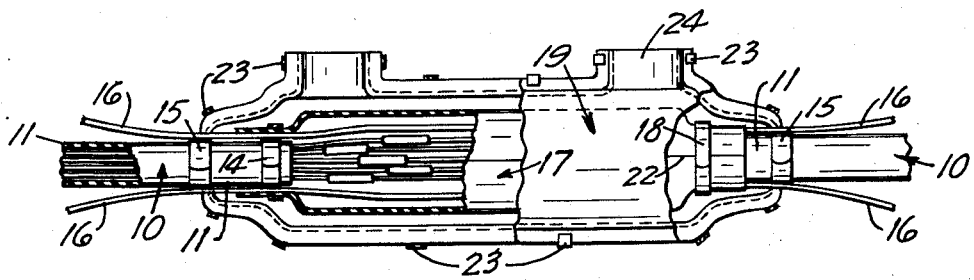
Figure 11 represents a modification of the structure shown in Figure 1.

Figure 1 illustrates my novel splice protector as applied to a straight splice in a multi-conductor telephone cable 10. The conductors 12, in the form of individually wrapped or insulated copper wires, are contained within an external tubular sheath 11. The bared ends of the conductors 12 are joined with similar ends from another cable section in making the desired splice, and the juncture areas are protected with shields 13, which may consist of individual insulating tubes, wrappings of adhesive tape, or other well known means.

Between the end of the cable sheath 11 and the nearest of the protective shields 13 the bundle of conductors 12 is wound with a strip of plastic filler material which serves to hold the conductors in a compact bundle and to provide an inner gasket 14 supporting the subsequently affixed splice protector unit. A similar application of plastic filler strip is applied around the sheathed end of the cable to form an outer gasket 15. These same operations are performed at each end of the splice area.

Steel wires 16 are next laid across the entire splice area, their ends extending well beyond the gasket members 15. The soft nature of the plastic filler material from which the gaskets are formed permits these wires to be pressed into and surrounded by the filler composition.

An inner hollow divided open ended tubular shell member 17 is next placed over the splice area. This shell member is divided along the plane of the cable; i.e. it is provided in two open halves which fit around the splice area and come together to provide a substantially liquid-tight seal along the juncture line 22. The end portions of this inner shell member are constricted to form tubular sleeves which closely fit around and extend somewhat beyond the plastic gaskets 14. The two halves of the shell member are effectively held together and in position on the supporting gaskets by means of strips of elastic adhesive tape 18 encircling the tubular constricted end areas under tension. A somewhat simpler structure involves a split shell having a uniform diameter, i.e. without the constricted end portions. The gasket 14 is enlarged to fit the shell, which is held in place by the tape 18. Where there is any likelihood of leakage along the seam 22 between the two halves of the shell 17, this area is also covered and sealed with strips of the same adhesive tape.

An outer shell 19 is next affixed over the inner shell and over the entire area to be protected. This shell likewise consists of two open faced halves 20 and 21, and is constricted at the ends to form circular openings just encircling the plastic gaskets 15 previously applied over the sheathed cable. The two halves are provided with fins around the circumference thereof, and tabs 23 are formed at intervals along the fins of one of the halves. These tabs are folded over the corresponding area of the fin on the opposite shield member and serve to hold the two shells firmly together. Other clamping or holding means, e.g. small C-clamps or metal-holding screws, may replace the tabs if desired, but the tabs are preferred as providing a more rapidly and easily assembled structure. One or more pouring spouts 24 are formed along the upper edge of the assembly by spaced-apart portions 25, 26 of the shells 20, 21, to provide access to the interior.

After the assembly is completed, as just described, a liquid potting compound is introduced through one of the pouring spouts 24 to fill and seal the entire space between the inner and outer shell members. Desirably, a self-hardening liquid resinous composition is employed for this purpose. It will be observed that the bundle of conductors 12 is exposed between the inner plastic gasket member 14 and the adjacent end of the external sheath 11 of the cable 10. The liquid resin is therefore enabled to penetrate into and around this bundle of conductors, and to follow between the conductors well within the areas enclosed by the gasket 14 and the end of the sheath 11. The bundle is thereby completely impregnated with the resin and sealed against any entry of water or moisture vapor. Since a rapidly setting resinous composition is employed, the resin is unable to penetrate much beyond the areas of the two gaskets 14 and 15 before it hardens to a solid condition; hence the interior of the shell 17 remains free of the impregnating composition.

On the other hand, placing the gasket 14 over the end portion of the cable covering 11, rather than over the exposed conductors, permits gases or liquids within the cable to pass along the splice area, which is completely sealed and protected from all outside influences. This method of forming the protective splice-covering is important in connection with gas-pressured cables. Such a structure is illustrated in Figure 11, wherein the sheath 11 is seen to extend within the end of the inner shell 17 and just beyond the gasket 14, at each end of the assembly. The resinous potting compound surrounds the inner shell and the accessible portion of the cable sheath.

Gases or liquids forced into the cable at other locations are permitted to flow freely along the entire cable, including the splice area.

The presence of the two pouring spouts as shown in Figure 1, or of a single pouring spout of substantially equivalent dimensions, permits addition of the resinous potting compound under slight hydrostatic pressure, with simultaneous removal of air, so that the entire space between the two shells, and around and between the conductors as already mentioned, is filled with the compound. Where only a single pouring spout is provided, other means of venting the entrapped air may be substituted. For example, a portion of the rim areas may be lightly fluted, or milled or roughened, or flock-coated, in order to provide a tightly fitting joint which retains resin but still permits passage of air.

The soft and plastic nature of the gaskets 14 and 15, and the structure of the various joints in the metal shells, all provide for an effective leak-proof structure so that the resinous composition is used to its fullest advantage. The final assembly therefore provides a hermetically sealed covered splice area which is completely resistant to penetration by water or moisture vapor and in addition is mechanically very strong.

Figure 3 illustrates a method by which the wire 16 may be directly attached to a section of the shell 17, thus obviating any possibility of losing or displacing the wire member. In this structure, a short, narrow, circumferential section of the constricted end portion of the shell segment is forced inwardly to provide a recess through which the wire member 16 may be passed. Similar structure is also effective in providing clamping means for attaching the ends of a shielding member, not shown, which in many cases surrounds the bundle of conductors within the cable 10, so that continuous shielding of the splice area and of the cable is maintained.

The structure illustrated in Figure 4 will be seen to be very similar to that in Figure 1 except that a Y splice is involved, and the size and shape of the shell members must therefore be altered to fit the enlarged cable section at the one end. In this figure, cables 40 and 41 are joined together in a straight splice, and cable 42 is joined thereto to provide a Y splice. The larger tubular constricted end of the inner shell 43, in this case oblong rather than circular in cross-section, is sealed to the inner plastic gasket 44 and held in place by a winding of elastic adhesive tape 45, other portions of such tape being employed, as indicated at 46, to cover and seal the joined edges of the divided shell 43. The constricted ends of the outer shell 47 form an effective seal against the plastic gaskets 48, 49. Gasket 48 also fills and seals the space between the two cables 40 and 42.

One of the steel wires is illustrated as being coiled at one end in a coil 50, thereby illustrating one method of preventing the wire from being pulled longitudinally from the assembly during the opening operation now to be described.

After the resinous potting compound has been poured into the space between the outer and inner shells of such a splice protector and has hardened fully, to provide the desired hermetically sealed cover, it is found impossible effectively to open and remove such covering member by the usual means without damaging the cable or the splice area. The present invention provides means for opening and removing the entire splice protector, including the mass of solidified resinous potting compound, in a simple and rapid manner. In achieving this result, the steel wires inserted in the original assembly are employed as tear strips for cutting open and separating the entire splice protector unit. An exposed end of the wire is first inserted in the opening 60 of a suitable key 61 as illustrated in Figure 6, and the latter is then twisted and rolled along the edge of the outer shell to cause the wire to cut through the inner and outer metal shells and the hardened resin and other components contained therebetween. Adhesion of the resin to the wire is ordinarily sufficient to prevent the latter from being removed longitudinally under such stress; or the opposite end of the wire may be formed into a coil 50 as in Figure 4 where necessary to prevent such longitudinal removal; or one end of the wire may be otherwise anchored at the end of the outer shell. After both of the wires have thus been forced through the splice-protector, the two halves may easily be separated with a screwdriver or other wedge, thus exposing the splice area. The two halves of the removed protector are discarded.

The tear-strip wires may be omitted where a permanent covering is desired, for example in buried or submerged cables, while still retaining the other advantages of the novel splice-protector of this invention.

Thin aluminum sheeting has been found to be most satisfactory as a construction material for the shell members of my novel splice protector unit. This material lends itself readily to the required shaping and forming, retains its shape under normal handling and during application, is light in weight and adequately weather-resistant, and is easily torn or cut by tear stripping as indicated. Accurate shaping is possible and provides reasonably liquid-tight joints between the separate halves of the shell members. Where other materials are employed, or where leakage might otherwise be anticipated, liquid-tight joints may be provided either by the application of adhesive tape as at 46 in Figures 4 and 5 or by the introduction of suitable gasket material as at 51 in Figure 5. The shell members may alternatively be made of cast or injected-molded resins, either thermosetting or thermoplastic, in which case close-fitting liquid-tight overlapping joints are easily provided.

Figure 7 illustrates another form of the splice protector made in accordance with the principles of this invention in which the inner shell 17 of Figure 1 is replaced by an overlapped spiral wrapping of protective adhesive tape 77. The wrapping of insulating tape is placed over the spliced portions 73 of the conductors 72, over the terminal gasket members 74, and over the wire tear strip 76, to provide an equivalently protected splice area. Portions of the group of conductors lying between the ends of the cable insulation 71 and the gasket members 74 are fully exposed to penetration by the liquid resinous impregnating material subsequently to be applied, as in the structure of Figure 1. The external shell 79, composed of a plurality of longitudinally fitted segments, fits snugly around the gasket members 75 at both ends of the splice area. The shell 79 is open along the entire uppermost portion, the open sides forming a narrow trough 80 through which the liquid resin is poured and the displaced air is vented. The end diameter is adjustable at cut-off grooves 85.

The cable 70 of Figure 7 is provided with a braided metallic shielding member 81 between the outer covering 71 and the inner conductors 72. Contact with this shielding member 81 is provided by means of a ski-shaped probe member 82, which is forced between the shield and the outer covering as illustrated in Figure 8. Where the cover member 79 is of metal, the probes 82 may be directly riveted to it as at 83 in Figure 7. The splice area is thus effectively shielded by the cover member 79 as an electrical continuation of the cable shield 81.

The same probe member may equally well be connected to the inner shell member 17 of Figure 1, for example by the split-pin clamping member 84 of Figure 9. The split pin is forced over an extended free edge of the metallic shell. In the absence of either the metallic shell 17 or the metallic outer shield 79, a continuous circuit may be maintained between the shield components 81 of the spliced cable by clamping the two probe members 82, through the split pin connectors 84, to the tear strip wire 76 or another interconnecting conductor, or to each other.

The plastic filler strip material employed as a gasket around the bundle of conductors and around the cable in forming liquid-tight joints at the ends of the inner and outer shell members may be made by homogeneously blending the following materials in the proportions indicated:

| | Parts by weight |
|---|---|
| Butyl rubber | 100 |
| Polyisobutylene | 10 |
| Polyethylene | 12 |
| Diatomaceous earth | 60 |
| Heavy paraffin oil | 34 |
| Compatible tackifier resin | 8 |
| Carbon black | 5 |

The mixture is then extruded in a strip approximately one-eighth inch thick and of any desired width, to provide a tape product which is soft and plastic and may be molded in place around the conductors or cable, and which is self-adherent as well as adherent to the insulated surfaces, so as to provide a well-bonded, compact and dense gasket member.

Other compositions having analogous properties may replace the plastic gasket composition above-identified, and such materials may be applied in the form of putty or dough rather than as pre-formed tape. However the last-named modification affords the greatest convenience and is preferred for this application.

A convenient strip material for holding together the two parts of the inner tubular shell member is a pressure-sensitive adhesive insulating tape having a tacky pressure-sensitive adhesive coating on a readily stretchable and substantially completely retractable plastic backing such as a plasticized polyvinyl chloride film. When applied under moderate tension, the tape is initially stretched and then slowly but forcefully retracts, thus drawing the two parts of the shell member closely and firmly together to provide an effective seal between the close-fitting edges of the shell. The tape product may also be applied in a single layer along the adjoining edges, in this case being applied under substantially no tension so that it remains firmly in place, thus ensuring that the joint remains liquid-tight. This tape product may also serve as the gasket material 51 of Figure 5 where desired, although pre-formed paper gaskets may equally well be employed.

Plastic shell segments may be formed with interlocking edges, as illustrated in Figure 10, and snap catches may be built into the metal shell segments, for the purpose of replacing the plastic tape as a means of holding the shell segments tightly together. However the structure and method described in Figures 1 and 4 represents simplified, fully effective, and preferred practice.

Liquid epoxy resins have been found to give best results as potting compounds for filling the space between the two shells of my novel splice protectors, since these materials are strongly adherent to the several types of surfaces encountered, have all required electrical and mechanical characteristics, and may be applied in thin liquid form which then rapidly sets to a hard tough solid form.

One such liquid self-hardening compound which has given particularly desirable results in terms of high initial fluidity, rapid cure, firm adherent bond to all contacted surfaces, high mechanical and electrical strength, and superior resistance to penetration by water or water vapor, consists of a mixture of liquid epoxy resin with a minor proportion of a liquid mixture of reagents reactive therewith and comprising liquid polythiopolymercaptan polymer and liquid polyamine. The epoxy resin is a reaction product of a bisphenol and epichlorohydrin, having free epoxy groups in the molecule. "Epon" resin No. 562 is a typical commercial example; and "Thiokol" polymer LP-2 is a commercial example of a suitable liquid polythiopolymercaptan polymer. Polyamines such as 2,4,6-tri(dimethylaminoethyl)phenol are effective activators for these compositions. The several components may be separately measured and all combined at the same time. More desirably, the amine and the polysulfide polymer are separately mixed together, and this mixture is combined with the epoxy resin just prior to pouring the composite around the splice. Mixing is conveniently accomplished in a flexible plastic bag, from which the mixture is poured directly into the open spout of the splice-protector as previously described.

What I claim is as follows:

1. An openable splice protector providing a protective enclosure around a splice area in an externally sheathed insulated electric cable, comprising: (a) an inner hollow divided open-ended tubular shell member surrounding the splice area, having end portions fitting around the conductor portion of said cable; (b) an outer hollow divided open-ended tubular shell member providing an enclosure around said inner shell, having constricted end portions closely fitting around the external sheathed portion of said cable and having at least one filling-spout; (c) tear strip members parallel to said cable, within said inner and outer shell members, extending beyond one end of said outer shell member for engagement with a key and firmly anchored at the other end of said outer shell member; and (d) a hardened potting compound filling said enclosure.

2. An openable splice protector providing a protective enclosure around a splice area in an externally sheathed insulated electric cable, comprising: (a) an inner protective covering for the spliced area; (b) an outer protective shield providing an enclosure around said covering; (c) a tear strip member lying parallel to the cable within said covering and said shield, extending beyond said shield at one end thereof for engagement with key-like removing means, and anchored against longitudinal removal at the other end of said shield; and (d) a hardened potting compound filling said enclosure.

3. A splice protector according to claim 2 in which the inner protective covering is shorter than the distance between the exposed ends of the external sheath of the cable at the splice area.

4. A splice protector according to claim 2 in which the inner protective covering overlaps and seals the exposed ends of the external sheath of the cable at the splice area and provides a continuation of the fluid-carrying passages between the several conductor members of spliced multi-conductor sheathed cable.

5. An externally sheathed insulated electric cable having a splice area hermetically sealed within an openable splice-protector assembly comprising an inner shell member, an outer shell member, a hardened potting compound filling the space between said shell members and providing a hermetic seal around said splice area, and tear strip members each lying within said assembly parallel to the cable and having one end extending beyond the corresponding end of said assembly for engagement with a key and the other end of the tear strip member being firmly anchored at the other end of said assembly.

6. The method of providing an openable hermetically sealed protective covering around a splice area in a multi-conductor electric cable assembly wherein a bundle of insulated conductors is enclosed within an outer sheath, said method comprising: separately surrounding the sheathed cable and the unsheathed bundle of conductors at each side of the splice area with an outer ring and an inner ring respectively of plastic gasket material while providing access to said unsheathed bundle therebetween; placing tear-strip elements along the splice overlapping the outer ring gaskets and enclosing the splice area between the inner ring gaskets with an inner hollow divided open-ended tubular shell member having constricted end portions closely fitting around corresponding inner ring gaskets; enclosing the entire splice area with an outer hollow divided open-ended tubular shell member having constricted end portions closely fitting around corresponding outer ring gaskets and having at least one open filling-spout; and filling the space between said inner and outer shell members with a free-flowing temporarily liquid self-hardening potting compound.

7. The method of providing an openable protective covering around a splice area in an electric cable assembly, comprising placing a tear-strip lengthwise of said splice area, applying over said splice area and said tear strip an inner protective covering for said splice area, applying over said covering an outer protective shield having a filling-spout, filling the space between said covering and said shield with a liquid self-hardening self-curing resinous insulating composition, and permitting the composition to cure.

8. An openable splice protector providing an electrically shielding protective enclosure around a splice area in a spliced shielded insulated cable, comprising: an inner protective covering for the spliced area, and an outer protective shield providing an enclosure around said covering, at least one of said covering and said shield being electrically conductive; probe members fitting into each cable-end in contact with the shielding component of said cable and connected to said conductive member; a tear strip member lying along said spliced area within said covering and shield, accessibly extending beyond said shield at one end thereof and anchored against longitudinal removal at the other end of said shield; and said enclosure being filled with a hardened potting compound.

9. The method of providing an openable protective covering around the spliced ends of an electric cable having an external sheath, comprising placing a tear-strip lengthwise of the splice area, applying an inner protective covering over the splice area and tear-strip and extending beyond the ends of said external sheath, applying over said covering an outer protective shield having a filling-spout, filling the space between said covering and said shield with a liquid potting compound, and hardening said compound.

10. The method of providing an openable protective covering around the spliced ends of an electric cable having an external sheath, comprising placing a tear-strip lengthwise of the splice area, applying an inner protective covering over the splice area and tear strip between the ends of said external sheath, applying over said covering an outer protective shield having a filling-spout and extending beyond the ends of said external sheath, filling with liquid potting compound the space between said covering and said shield and around the exposed conductors between the ends of said covering and said sheath, and hardening said compound.

References Cited in the file of this patent

UNITED STATES PATENTS

| 608,412 | Patten et al. | Aug. 2, 1898 |
| 1,249,498 | Rice | Dec. 11, 1917 |
| 1,302,132 | Christie | Apr. 29, 1919 |
| 1,784,881 | Rah | Dec. 16, 1930 |
| 2,393,935 | Scott | Jan. 29, 1946 |
| 2,523,405 | Whithed | Sept. 26, 1950 |

FOREIGN PATENTS

| 7,593 | Great Britain | Mar. 30, 1909 |